(12) United States Patent
Teratani et al.

(10) Patent No.: US 7,803,733 B2
(45) Date of Patent: Sep. 28, 2010

(54) ALUMINUM NITRIDE SINTERED BODY AND SEMICONDUCTOR MANUFACTURING APPARATUS MEMBER

(75) Inventors: Naomi Teratani, Nagoya (JP); Yuji Katsuda, Tsushima (JP)

(73) Assignee: NGK Insulators, Ltd., Nagoya (JP)

( * ) Notice: Subject to any disclaimer, the term of this patent is extended or adjusted under 35 U.S.C. 154(b) by 273 days.

(21) Appl. No.: 12/054,715

(22) Filed: Mar. 25, 2008

(65) Prior Publication Data

US 2008/0242531 A1 Oct. 2, 2008

(30) Foreign Application Priority Data

Mar. 27, 2007 (JP) .............................. 2007-080697

(51) Int. Cl.
 *C04B 35/581* (2006.01)
(52) U.S. Cl. ..................................... 501/98.4
(58) Field of Classification Search ................. 501/98.4
 See application file for complete search history.

(56) References Cited

U.S. PATENT DOCUMENTS 6,001,760 A 12/1999 Katsuda et al.
6,225,249 B1 * 5/2001 Fujita et al. ................. 501/98.4
6,403,510 B1 * 6/2002 Kuibira et al. .............. 501/98.5
6,486,085 B1 11/2002 Katsuda et al.
6,607,836 B2 8/2003 Katsuda et al.
6,953,761 B2 * 10/2005 Tanaka et al. ............... 501/98.4
7,122,490 B2 10/2006 Kobayashi et al.

FOREIGN PATENT DOCUMENTS

| JP | 2001-163672 A1 | 6/2001 |
| JP | 2003-055052 A1 | 2/2003 |
| JP | 3457495 | 8/2003 |
| JP | 2004-262750 A1 | 9/2004 |
| JP | 2006273587 | * 10/2006 |

OTHER PUBLICATIONS

VanDamme, Nobuko S., et al., "Liquid-Phase Sintering of Aluminum Nitride by Europium Oxide Additives," J. Am. Ceram. Soc., 72 [8] (1989). pp. 1409-1414.

* cited by examiner

*Primary Examiner*—Karl E Group
(74) *Attorney, Agent, or Firm*—Burr & Brown

(57) ABSTRACT

The aluminum nitride sintered body includes at least europium, aluminum, and oxygen. It was found that a grain boundary phase having a peak having a X-ray diffraction profile substantially the same as that of an $Sr_3Al_2O_6$ phase could be three-dimensionally continued in the aluminum nitride sintered body to realize a lower resistance without damaging various properties unique to aluminum nitride.

7 Claims, 4 Drawing Sheets

FIG. 7

| | Raw powders | | | Sintering conditions | Sintered body property | |
|---|---|---|---|---|---|---|
| | AlN powders | | | | Chemical analysis value | |
| | Oxygen content wt% | $Eu_2O_3$ mol% | | Highest temperature °C | Eu content wt% | O content wt% |
| Example 1 | 0.87 | 0.57 | | 1800 | 3.52 | 1.21 |
| Example 2 | 0.87 | 0.57 | | 1900 | 2.74 | 1.15 |
| Example 3 | 0.87 | 0.34 | | 1900 | 1.80 | 0.83 |
| Example 4 | 0.87 | 1.02 | | 1800 | 6.39 | 1.43 |
| Comparative example 1 | 0.87 | 0.34 | | 1800 | 2.44 | 1.12 |
| Comparative example 2 | 0.87 | 0.01 | | 1800 | 0.08 | 0.71 |

| | | | Sintered body property | | | | | |
|---|---|---|---|---|---|---|---|---|
| | $Eu_2O_3$-reduced amount mol% | $Al_2O_3$-reduced amount mol% | $Eu_2O_3/Al_2O_3$ mol ratio | Open porosity % | Bulk density g/cm³ | Volume resistivity (Ω·cm) 25°C | Thermal conductivity W/mK | Crystalline phase (except for AlN) | Luminescence peak wavelength (nm) |
| Example 1 | 0.48 | 0.57 | 0.85 | 0.05 | 3.32 | 7.4E+03 | 119 | $Eu_3Al_2O_6$, $EuAl_2O_4$ | 518 |
| Example 2 | 0.37 | 0.62 | 0.60 | 0.04 | 3.30 | 1.6E+03 | 131 | $Eu_3Al_2O_6$, $EuAl_2O_4$ | 518 |
| Example 3 | 0.24 | 0.47 | 0.52 | 0.05 | 3.28 | 9.0E+07 | 130 | $EuAl_2O_4$, $Eu_3Al_2O_6$ | 519 |
| Example 4 | 0.89 | 0.37 | 2.40 | 0.04 | 3.49 | 1.5E+02 | 128 | $Eu_3Al_2O_6$ | 517 |
| Comparative example 1 | 0.30 | 0.65 | 0.46 | 0.03 | 3.30 | 6.9E+15 | 116 | $EuAl_2O_4$, $Eu_3Al_2O_6$ | 518 |
| Comparative example 2 | 0.01 | 0.60 | 0.02 | 0.04 | 3.26 | 4.8E+14 | 87 | $EuAl_2O_4$, $EuAl_{11}O_{18}$($EuAl_{12}O_{19}$) | 521 |

US 7,803,733 B2

ALUMINUM NITRIDE SINTERED BODY AND SEMICONDUCTOR MANUFACTURING APPARATUS MEMBER

CROSS REFERENCE TO RELATED APPLICATION

This application is based upon and claims the benefit of priority from a Japanese Patent Application No. TOKUGAN 2007-80697, filed on Mar. 27, 2007; the entire contents of which are incorporated herein by reference.

BACKGROUND OF THE INVENTION

1. Field of the Invention

The present invention relates to an aluminum nitride sintered body that is preferable as a semiconductor manufacturing apparatus member such as heater material or electrostatic chuck material.

2. Description of the Related Art

Conventionally, an aluminum nitride sintered body has superior heat resistance and corrosion resistance and has a high thermal conductivity. Thus, an aluminum nitride sintered body is used, in a semiconductor manufacturing apparatus (e.g., plasma etching apparatus, plasma CVD apparatus), as base material of an electrostatic chuck for fixing a wafer or a ceramics heater for heating a wafer. For example, a current application for an electrostatic chuck mainly uses a Johnson Rahbeck force as a chucking force. In order to obtain a favorable chucking property, this electrostatic chuck as base material requires a relatively-low volume resistivity of $10^8$ to $10^{12}$ Ωcm. However, aluminum nitride itself is high-resistance material having a volume resistivity at a room temperature of $10^{14}$ Ωcm or more and thus must have a lower resistivity. Due to the background as described above, as disclosed in Japanese Patent No. 3457495, Japanese Laid-Open Patent Publication No. 2001-163672, Japanese Laid-Open Patent Publication No. 2003-55052, and Japanese Laid-Open Patent Publication No. 2004-262750, the applicant of the present application has developed an aluminum nitride sintered body having a low resistivity of about $10^8$ to $10^{12}$ Ωcm by adding rare-earth oxide (e.g., yttrium oxide, cerium oxide, samarium oxide, and europium oxide) to aluminum nitride sintered body.

As described above, the base material used for an electrostatic chuck application requires a volume resistivity of about $10^8$ to $10^{12}$ Ωcm in order to obtain a chucking force based on the Johnson Rahbeck principle. However, among ceramic members used in semiconductor-manufacturing apparatuses, there is a case where a lower resistivity is required depending on an application. For example, in a plasma etching apparatus or the like, a ring-shaped ceramic member is placed around the electrostatic chuck to prevent the base substance of the electrostatic chuck from corrosion by halide gas. An insulative ceramic has been conventionally used for this ring-shaped member.

However, to generate uniform and stable plasma on a wafer to be placed on the electrostatic chuck, it is desired to use a material having the volume resistivity equivalent to that of the wafer as the ring-shaped member which is exposed around the wafer. Accordingly, it is necessary to provide the base substance material for the ring-shaped member with electric conductivity equal to or below $10^4$ Ωcm, which represents a semiconductor region equivalent to a silicon wafer, for example. Moreover, a ceramic member having higher electric conductivity can diversify usability not only for semiconductors but also for various applications as an electrically conductive member provided with corrosion resistance, heat resistance and strength.

For example, a method of adding an electrically conductive material such as titanium nitride (TiN) with an insulative ceramic material is known as a method of reducing a value of resistance of a ceramic. However, to obtain the volume resistivity equal to or below $10^4$ Ωcm according to by this method, a large amount of the electrically conductive material equal to or above 20 vol % must be added because it is necessary to form electrically conductive paths inside the ceramic material by use of the electrically conductive material.

However, when such a large amount of the electrically conductive material is added, it is difficult to maintain characteristics properties of the ceramic material being a mother material. For example, when aluminum nitride is used as the mother material, there is a risk of damaging the high thermal conductivity, the heat resistance, and halogen resistance of aluminum nitride. Therefore, to maintain the characteristics properties of the mother material, it is desired to use an additive material which can reduce the value of volume resistivity by adding the material as little as possible.

The present invention has been made in order to solve the above-described disadvantages. It is an objective of the invention to provide an aluminum nitride sintered body that retains the property unique to aluminum nitride and that has a resistance controlled in a wide range.

SUMMARY OF THE INVENTION

The inventors of the present application have found that, when an aluminum nitride sintered body includes aluminum nitride (AlN) as a main component, the aluminum nitride sintered body includes at least europium (Eu), aluminum (Al), and oxygen (O), and a grain boundary phase having a X-ray diffraction profile having a peak substantially the same as that of an $Sr_3Al_2O_6$ phase is three-dimensionally continued in the aluminum nitride sintered body, the volume resistivity at a room temperature can be sufficiently reduced without damaging the property unique to aluminum nitride, thereby realizing a resistance in a range from few hundreds to $10^{12}$ Ω·cm. It is noted that, although Patent Publication 4 described above discloses that europium of 0.03 mol % or more (which is converted to oxide) is added, these materials have a conducting phase of an $EuAl_{11}O_{18}$ phase or an $EuAl_{12}O_{19}$ phase to show a different conductive mechanism. Furthermore, although Non-Patent Publication 1 as described above discloses an aluminum nitride sintered body using europium oxide as sintering agent, Non-Patent Publication 1 neither discloses a sintered body including a crystalline phase having an X-ray diffraction profile having a peak substantially the same as that of a $Sr_3Al_2O_6$ phase nor an electric resistance property.

BRIEF DESCRIPTION OF THE DRAWINGS

Examples of the invention will become more fully apparent from the following description and appended claims, taken in conjunction with the accompanying drawings. Understanding that these drawings depict only examples and are, therefore, not to be considered limiting of the invention's scope, the examples of the invention will be described with additional specificity and detail through use of the accompanying drawings in which:

FIG. 7 shows preparation conditions and evaluation results of sintered body of examples and comparative examples.

DETAILED DESCRIPTION OF THE INVENTION

Figure 1:
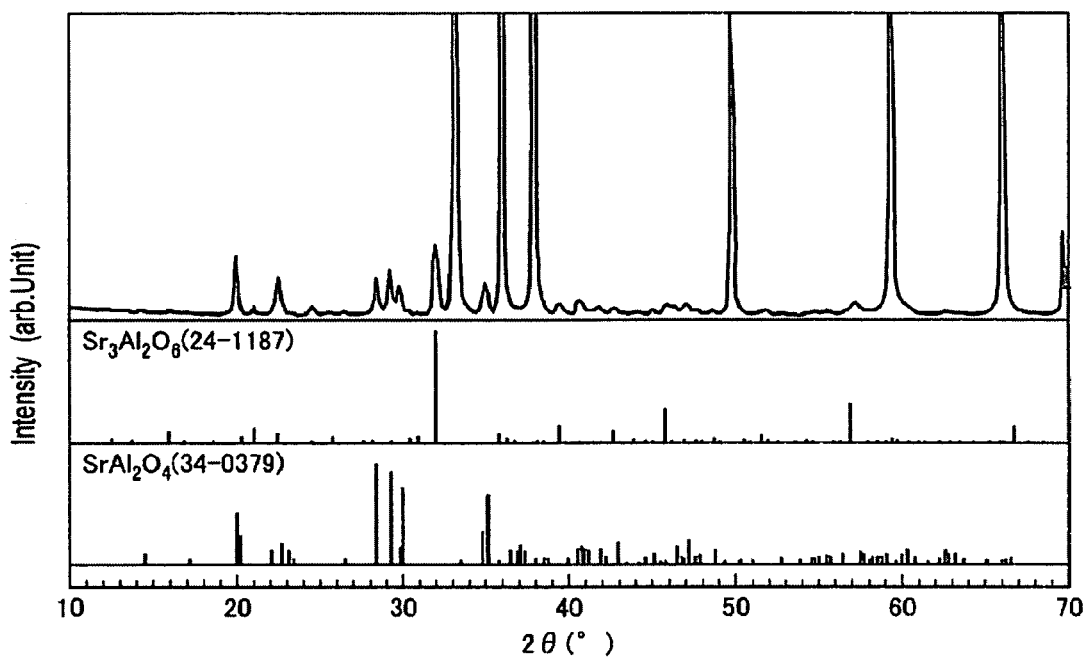
FIG. 1 shows an X-ray diffraction profile obtained from the aluminum nitride sintered body of example 1.

In the present invention, a molar ratio of europium to aluminum content of oxide-converted content ($Eu_2O_3/Al_2O_3$) is preferably 0.5 or more and is more preferably 0.6 or more. As a result, $Eu_3Al_2O_6$ which is a conducting phase can be efficiently generated at the grain boundary phase of the aluminum nitride sintered body. Here, $Eu_3Al_2O_6$ is the europium-aluminum oxide which has an X-ray diffraction profile having a peak substantially the same as that of an $Sr_3Al_2O_6$ phase. The upper limit of ($Eu_2O_3/Al_2O_3$) is preferably 3.0 or less. The reason is that ($Eu_2O_3/Al_2O_3$) exceeding this limit causes excessive $Eu_2O_3$ in the entirety to cause $Eu_2O_3$ unreacted with $Al_2O_3$ to remain in the aluminum nitride sintered body, causing a risk of an adverse impact on the thermal conductivity.

Here, the molar ratio of the oxide-converted content of europium to the alumina content ($Eu_2O_3/Al_2O_3$) was calculated in the manner as described below. First, the $Eu_2O_3$ content is calculated as $Eu_2O_3$ based on a chemical analysis value of an europium amount included in the aluminum nitride sintered body. It is assumed that the remaining oxygen obtained by deducting an $Eu_2O_3$-retaining oxygen amount from the total oxygen amount in the sintered body exists in the form of $Al_2O_3$ to calculate the $Al_2O_3$ content. The ratio of them was calculated to calculate ($Eu_2O_3/Al_2O_3$). However, a part of europium contained in the material of the present invention is considered as being divalent.

In the present invention, preferably, the europium-aluminum oxide phase has a formation of the network microstructure. Specifically, the europium-aluminum oxide phase is continuously existed so as to surround the aluminum nitride grains to generate a network microstructure. Although the average grain diameter of the aluminum nitride is not limited, the average grain diameter is preferably 3 μm or more from the viewpoint of the thermal conductivity. Since an increased aluminum nitride grain diameter may cause a risk of a reduced strength, the average grain diameter is preferably 20 μm or less.

The aluminum nitride sintered body according to the present invention includes the europium-aluminum oxide phase. The europium-aluminum oxide phase must have a specific composition having a phase having a peak substantially the same as that of $Sr_3Al_2O_6$. However, a crystalline phase other than this also may exist. For example, when the crystalline phase containing Eu, Al, and O having a peak substantially the same as that of the $SrAl_2O_4$ phase exists, provided is an effect according to which a temperature for providing a lower resistance is reduced.

The aluminum nitride sintered body preferably has a relative density of 95% or more. Aluminum nitride can be made of raw material made by various manufacture methods (e.g., direct nitriding, reduction-nitridation, vapor-phase synthesis from alkyl aluminum).

Raw material of europium is added to raw powders of aluminum nitride. This raw material can be europium oxide. Alternatively, the respective compounds generating europium oxide when being heated (europium oxide precursor) (e.g., europium nitrate, europium sulfate, europium oxalate) also can be added to raw powders of aluminum nitride. The respective precursors can be added in the form of powders. The respective precursors also can be dissolved in solvent to obtain solution to add this solution to raw powders. When the respective precursors are dissolved in the solvent as described above, europium can be highly dispersed in aluminum nitride sintered body.

The green body can be formed by known methods such as a dry pressing, a doctor blade method, extrusion, casting, or a tape casting method. In a blending step, raw powders of aluminum nitride can be dispersed in the solvent to add therein the europium oxide compound in the above-described form of oxide powders or solution. Although the mixing can be carried out by a simple agitation, when agglutinated matter in the raw powders must be crushed, a mixer/crusher (e.g., pot mill, trommel, attrition mill) can be used. When material that can be dissolved in to-be-grinded solvent is used as an additive, a step required for a mixing/grinding step may require the minimum time required to crush the powders. A binder component such as polyvinyl alcohol also can be added to the additive.

The step of drying the to-be-mixed solvent is preferably a spray dry method. This step is also preferably carried out by carrying out the vacuum drying process, the particle distribution of the dried particles may preferably be adjusted by passing the particles through a mesh. In a shaping step of the powdery material, the material may be pressed using a mold to provide a disk-shaped body. Although the shape forming pressure is preferably 10 MPa or more, the pressure is not particularly limited so long as the shape can be retained. Powders also can be filled in a hot press die. The sintering is preferably carried out by the hot press sintering to subject to-be-sintered material to a hot press sintering under a pressure of 5 MPa or more.

The aluminum nitride sintered body according to this embodiment has a heat resistance owned by the aluminum nitride sintered body, a corrosion resistance to halogen gas, a high thermal conductivity, and a controlled conductivity. Thus, the aluminum nitride sintered body according to this embodiment can be used as a member of a semiconductor manufacturing apparatus using corrosive gas and corrosive solution in a semiconductor process such as a deposition apparatus (e.g., plasma CVD, sputter), a plasma etching apparatus, and a cleaning apparatus. For example, a member of the semiconductor manufacturing apparatus illustratively includes a susceptor, a heater, an electrostatic chuck, a ring-shaped member, and a doom-shaped member. The aluminum nitride sintered body according to this embodiment also can be used as a member of a part in electronic devices requiring an electric-field control that is required to have a predetermined volume resistivity.

When the aluminum nitride sintered body has a volume resistivity of $10^8$ to $10^{12}$ Ωcm in particular, this aluminum nitride sintered body can be favorably used as base material of an electrostatic chuck using the Johnson Rahbeck principle. An electrostatic chuck is structured to include a bulk electrode or a printed electrode in a discoid aluminum nitride sintered body.

When the aluminum nitride sintered body has a volume resistivity of $10^8$ Ωcm or less at a room temperature, this aluminum nitride sintered body can be favorably used as a ring-shaped member placed to surround the electrostatic chuck in a plasma CVD or a plasma etching apparatus. When the ring-shaped member according to this embodiment is used instead of the insulating ring-shaped member as in the conventional design, the ring-shaped member can be prevented from having charge-up caused in the generation of plasma. The charge-up causes a variation in the ion density to cause a not-uniform distribution of plasma. However, since this invention can prevent the charge-up, the plasma distribution can be uniform. The effect is particularly high when the body has the same volume resistivity as that of a wafer.

When the aluminum nitride sintered body has a volume resistivity of $10^6$ Ωcm or less at a room temperature, this aluminum nitride sintered body can be widely used as a new conductive member having a heat resistance, a corrosion resistance, and a high thermal conductivity. For example, this aluminum nitride sintered body can be favorably used as opposed electrodes for generating a high frequency for a semiconductor manufacturing apparatus or an electrode or a resistance heating element exposed to halogen-base gas or various corrosive gases. In addition to the application to the semiconductor manufacturing apparatus member, this aluminum nitride sintered body also can be favorably used as various resistance heating elements, a neutralization member, or an electric-field control member particularly under a high-temperature environment or a corrosive gas environment in which metal cannot be used.

An electric-field control member exemplarily includes a spacer provided between a face plate and a back plate in a flat display, for example. This spacer desirably has an appropriate conductivity so as to prevent the electrostatic charge of the spacer surface so as not to be influenced by the flow of electrons emitted from an electron emitter to the face plate and so as to control the voltage between the face plate and the back plate to prevent the flow of electrons from being distorted. The range of the conductivity is desirably provided so that the volume resistivity can be selected in a range of 10 to $10^{12}$ Ωcm in accordance with the conditions of the display. Therefore, the above-described aluminum nitride sintered body according to this embodiment can be favorably used.

Hereinafter, examples and comparative examples of the present invention will be described specifically.

Examples 1 to 4

Preparation Conditions of Mixed Powders

First, aluminum nitride powders were mixed with europium oxide powders to prepare mixed powders. Commercially-available aluminum nitride powders having an average particle diameter of 1.4 μm (made by Tokuyama) synthesized by the reduction-nitridation method were used. Europium oxide powders having a purity of 99.9% or more and an average particle diameter of 1.8 μm (made by Nippon Yttrium Co., Ltd.) were used. The aluminum nitride powders and europium oxide powders were weighed as shown in FIG. 7 and were added with solvent of isopropyl alcohol. The resultant powders were wet-blended by a nylon-made pot and balls for four hours. After the blending, slurry was taken out and was dried in nitrogen gas atmosphere at 110° C. Then, the dried powders were sifted to obtain mixed powders. It is noted that the additive amounts of the europium oxide in FIG. 7 are represented by values ignoring the impurity content.

<Shape Forming and Sintering Conditions>

The mixed powders were placed in forming dies and were uniaxially pressed with a pressure of 20 MPa to prepare a disk-shaped compact having a diameter of φ50 mm and a thickness of about 20 mm. The sintering process was carried out by the hot press method. The obtained compact was put in a graphite mold for sintering and was set to a hot press sintering furnace. The pressing pressure was set to 20 MPa and the highest temperature during the sintering process was set in a range from 1800 to 1900° C. This temperature was retained for four hours to subsequently carry out a cooling. Concerning the atmosphere, a vacuum atmosphere was applied from room temperature to 1000° C., and a 0.15 MPa nitrogen atmosphere was applied from 1000° C. to the sintering temperature. The highest temperatures (sintering temperatures) during the sintering process in the respective examples are shown in FIG. 7.

<Evaluation of Sintered Body>

The open porosity, bulk density, volume resistivity, thermal conductivity, oxygen content, Eu content, crystalline phase, and the wavelength of luminescence peak were evaluated for each of the sintered bodies thus obtained. Concrete measurement methods for the respective evaluations are as follows.

The items of (1) a density and (2) an open porosity were evaluated by the Archimedes method by using purified water as media.

The item of (3) a volume resistivity was measured by the method based on JIS C2141 in air at the room temperature. Each sample piece was formed into a shape having dimensions of φ50×1 mm, and silver paste was used to form respective electrodes so as to satisfy the following dimensions, namely, a diameter of a main electrode at 20 mm, an inside diameter of a guard electrode at 30 mm, an outside diameter of the guard electrode at 40 mm, and a diameter of an application electrode at 40 mm. An applied voltage was in a range from 0.1 to 500 V/mm to read current caused when one minute has passed after the application of the voltage to calculate the volume resistivity.

The item of (4) thermal conductivity was measured by the laser flash method.

The item of (5) oxygen content was quantified by inert gas melting infrared absorptiometry.

The item of (6) Eu content was quantified by inductively coupled plasma (ICP) emission spectrum analysis.

The item of (7) generated crystalline phase was identified by an X-ray diffraction apparatus based on measurement conditions of CuKα, 50 kV, 300 mA, and 2θ=10 to 70° and by using a rotating target-type X-ray diffraction apparatus of "RINT" made by Rigaku Denki.

Here, the europium-aluminum oxide which has an X-ray diffraction profile having a peak substantially the same as that of an $Sr_3Al_2O_6$ was described to be $Eu_3Al_2O_6$, and the other europium-aluminum oxide which has an X-ray diffraction profile having a peak substantially the same as that of an $SrAl_2O_4$ was described to be $EuAl_2O_4$ in FIG. 7.

The item of (8) luminescence peak wavelength was measured by a spectrophotofluorometer FP-6300 (made by JASCO Corporation). The luminescence peak wavelength shows a value at the excitation at a wavelength showing the maximum strength (360 to 362 nm).

The result is shown in FIG. 7.

Comparative Examples 1 and 2

The aluminum nitride sintered bodies were prepared based on similar conditions as those of examples 1 to 4. The preparation conditions and the evaluation results are shown in FIG. 7.

Figure 2:
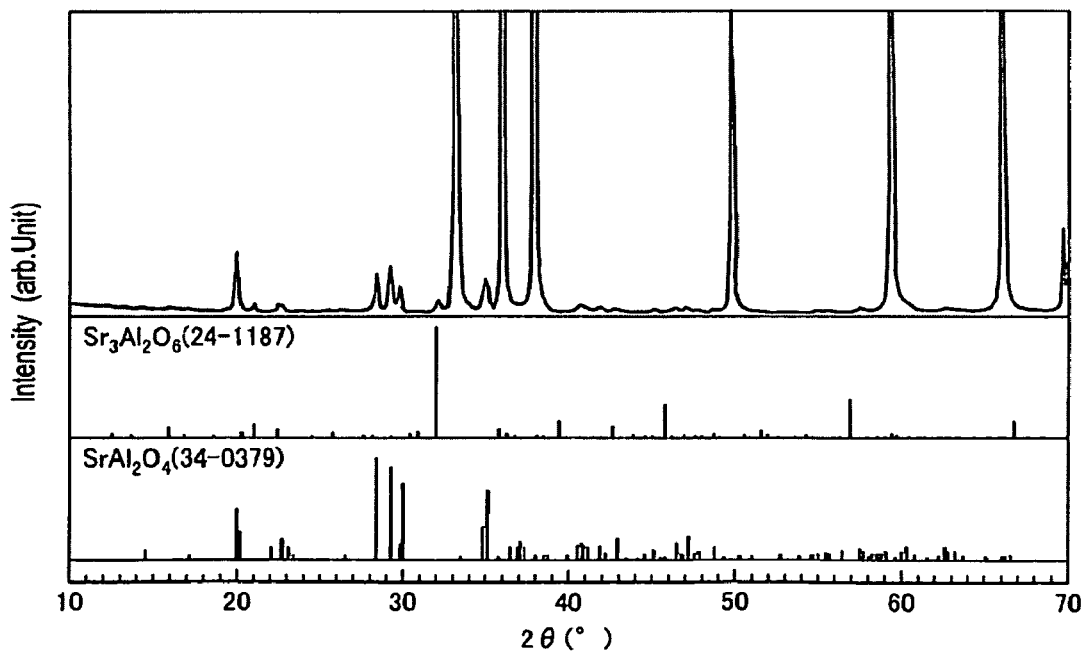
FIG. 2 shows an X-ray diffraction profile obtained from the aluminum nitride sintered body of example 3.

As can be seen from FIG. 7, the aluminum nitride sintered bodies of examples 1 to 4 show the volume resistivity at the room temperature of $1\times10^{12}$ Ωcm or less that are lower than the volume resistivity at the room temperature of the aluminum nitride sintered bodies of comparative examples 1 and 2. FIG. 1 and FIG. 2 show X-ray diffraction profiles obtained from the aluminum nitride sintered bodies of examples 1 and 3, respectively. As is clear from FIG. 1 and FIG. 2, the X-ray diffraction profile of the material of the present invention has peaks, in addition to AlN, that are substantially the same as those of the $Sr_3Al_2O_6$ phase and the $SrAl_2O_4$ phase. When the peak substantially the same as that of $Sr_3Al_2O_6$ estimated as the conducting phase of the material of the present invention is compared with the other peak substantially the same as that of $SrAl_2O_4$, example 1 shown in FIG. 1 clearly has a higher peak of $Sr_3Al_2O_6$ and has a higher content. When the volume resistivities are compared in FIG. 7, example 1 has a lower volume resistivity. Thus, it is considered that the volume resistivity is low due to the high conducting phase.

Figure 3:
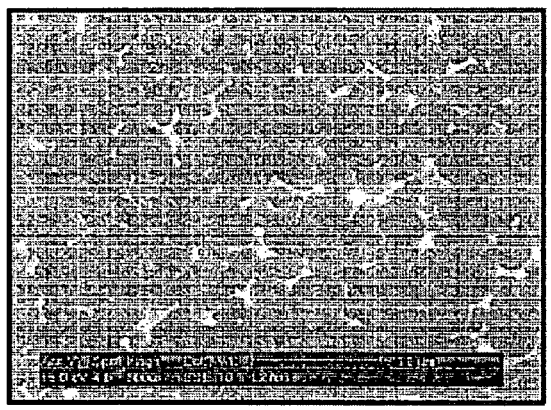
FIG. 3 shows an SEM image of a polished surface of the aluminum nitride sintered body of example 2.
Figure 4:
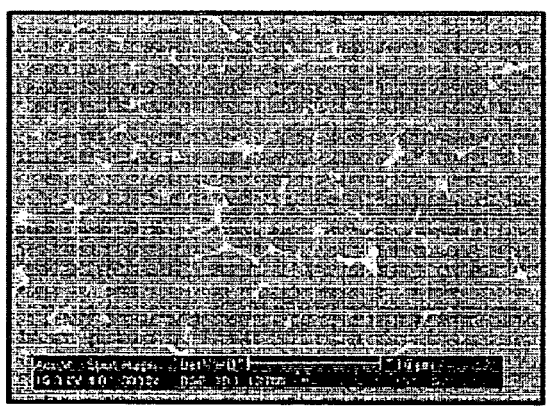
FIG. 4 shows an SEM image of a polished surface of the aluminum nitride sintered body of example 3.
Figure 5:
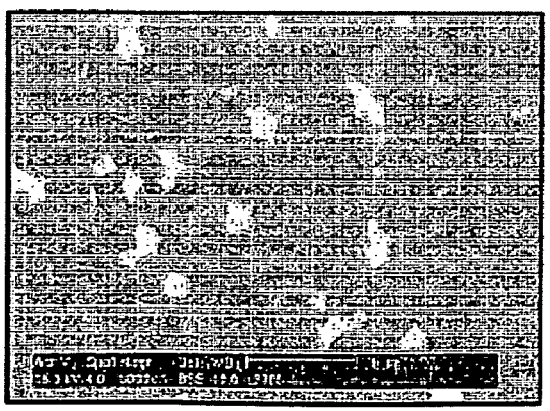
FIG. 5 shows an SEM image of a polished surface of the aluminum nitride sintered body of comparative example 1.
Figure 6:
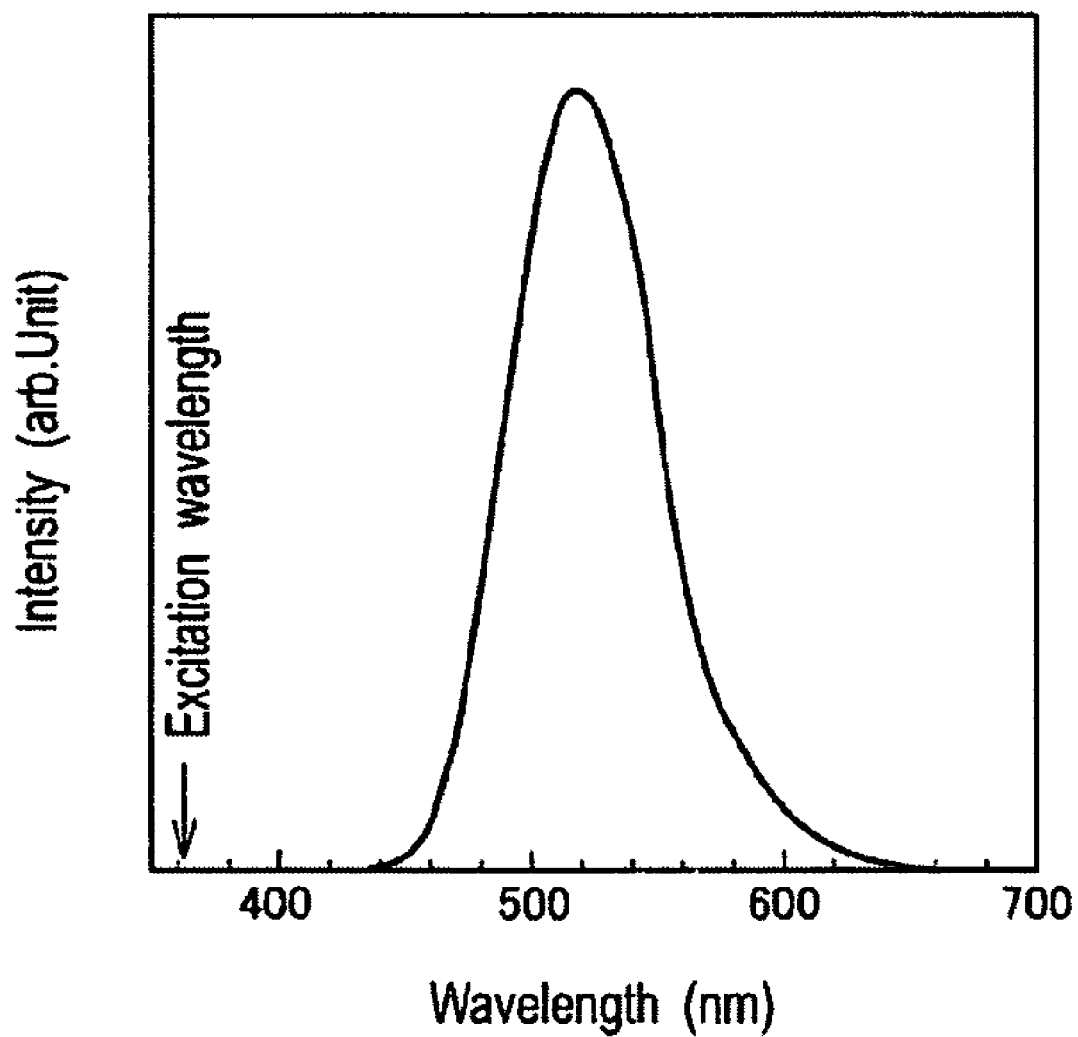
FIG. 6 shows a luminescence spectra excited by UV-ray obtained from the aluminum nitride sintered body of example 1.

A scanning electron microscope (SEM) was used to observe polished surfaces of the aluminum nitride sintered bodies of examples 1 to 4 and comparative examples 1 and 2, the polished surfaces of the aluminum nitride sintered bodies of examples 1 to 4 showed white continuous grain boundary phases having a different contrast from that of AlN. A further analysis by EDX showed that continuous grain boundary phase included at least Eu, Al, and O. FIGS. 3 to 5 show SEM images of the polished surfaces of the aluminum nitride sintered bodies of examples 2 and 3 and comparative example 1, respectively. Although FIGS. 3 and 4 show continuous grain boundary phases, FIG. 5 shows only an isolated white phase. Thus, comparative example 1 shows that at least the grain boundary phase containing Eu, Al, and O is not continuous to fail to provide a conductive path. Thus, it is considered that the volume resistivity did not decline. Based on the above, the aluminum nitride sintered body of examples 1 to 4 show the $Eu_3Al_2O_6$ phase (no state diagram and no JCPDS card) that exists as the continuous grain boundary phase to function as a conductive path. Thus, it is estimated that the aluminum nitride sintered body of examples 1 to 4 have a lower volume resistivity than those of the aluminum nitride sintered bodies of comparative examples 1 and 2. It is noted that, when the aluminum nitride sintered bodies of examples 1 to 4 were measured with regard to the thermal conductivity, any of examples 1 to 4 showed a thermal conductivity of 119 W/mK or more. When the aluminum nitride sintered bodies of examples 1 to 4 were evaluated with regards to the luminescence property when an electromagnetic wave or an electron beam having a wavelength of 400 nm or less was emitted thereto, any of examples 1 to 4 showed a luminescence property having a peak at a wavelength region of 600 nm or less. FIG. 6 shows a luminescence spectra of example 1 excited by UV-ray (362 nm). The observed luminescence peak was 518 nm. A valence of europium of added europium oxide is trivalent. Trivalent europium is generally known to show red light emission having a sharp peak due to $^5D_0 \rightarrow {}^7F_2$ transition and has a wavelength longer than 600 nm. However, the material of the present invention shows a main luminescence peak in a green region in a range from 517 to 519 nm as shown in FIG. 7 and the sharp peak unique to trivalent was not observed at 600 nm or more. It is unlikely that this broad green light emission is at least due to trivalent europium. At least a part of europium included in the material of the present invention was considered as divalent.

As is clear from the above description, according to the aluminum nitride sintered bodies of examples 1 to 4, a lower resistance can be realized without damaging the property unique to aluminum nitride. Also according to the aluminum nitride sintered bodies of examples 1 to 4, the range of the volume resistivity aluminum nitride at the room temperature can be expanded to obtain a lower resistance, thus providing an expanded range within which aluminum nitride can be applied to a member of a semiconductor manufacturing apparatus such as a conductive member.

As described above, embodiments using the invention made by the present inventors were described. However, the present invention is not limited by the discussion constituting a part of the disclosure of the present invention according to the embodiments and the drawings. Specifically, other embodiments, illustrative embodiments, and operation techniques or the like made by those skilled in the art based on the above embodiments are all included in the scope of the present invention.

What is claimed is:

1. An aluminum nitride sintered body comprising:
   aluminum nitride (AlN) as a main component; and
   a continuous grain boundary phase including at least europium, aluminum, and oxygen,
   wherein a component constituting the grain boundary phase has an X-ray diffraction profile having at least one peak that corresponds to at least one peak of an X-ray diffraction profile of an $Sr_3Al_2O_6$ phase.

2. The aluminum nitride sintered body according to claim 1, wherein the X-ray diffraction profile of the component constituting the grain boundary phase also has at least one peak that corresponds to at least one peak of an X-ray diffraction profile of an $SrAl_2O_4$ phase.

3. The aluminum nitride sintered body according to claim 1, wherein the europium is at least divalent.

4. The aluminum nitride sintered body according to claim 1, wherein the grain boundary phase is a conductive path.

5. The aluminum nitride sintered body according to claim 1, wherein the aluminum nitride sintered body has a room temperature volume resistivity in air of $1\times10^{12}$ Ωcm or less.

6. The aluminum nitride sintered body according to claim 1, wherein when an electromagnetic wave or an electron beam having a wavelength 400 nm or less is emitted to the aluminum nitride sintered body, the aluminum nitride sintered body shows light emission having a peak at a wavelength region of 600 nm or less.

7. A semiconductor manufacturing apparatus member at least partially comprising the aluminum nitride sintered body according to claim 1.

* * * * *